(12) United States Patent
Xiao et al.

(10) Patent No.: US 12,439,386 B2
(45) Date of Patent: Oct. 7, 2025

(54) DYNAMIC RESOURCE SCHEDULING IN WIRELESS COMMUNICATIONS

(71) Applicant: ZTE Corporation, Guangdong (CN)

(72) Inventors: Kai Xiao, Shenzhen (CN); Jing Shi, Shenzhen (CN); Peng Hao, Shenzhen (CN); Xingguang Wei, Shenzhen (CN); Wei Gou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 536 days.

(21) Appl. No.: 17/949,821

(22) Filed: Sep. 21, 2022

(65) Prior Publication Data
US 2023/0012010 A1    Jan. 12, 2023

Related U.S. Application Data

(63) Continuation of application No. PCT/CN2021/086086, filed on Apr. 9, 2021.

(51) Int. Cl.
*H04W 72/0446* (2023.01)
*H04W 72/0453* (2023.01)

(52) U.S. Cl.
CPC ... *H04W 72/0446* (2013.01); *H04W 72/0453* (2013.01)

(58) Field of Classification Search
CPC .......... H04W 72/0446; H04W 72/0453; Y02D 30/70
See application file for complete search history.

(56) References Cited

U.S. PATENT DOCUMENTS

2021/0219302 A1    7/2021  Fan et al.
2021/0329645 A1*  10/2021  Yang ................. H04W 72/0446
(Continued)

FOREIGN PATENT DOCUMENTS

| WO | 2020198947 A1 | 10/2020 |
| WO | 2020221021 A1 | 11/2020 |
| WO | 2021027898 A1 | 2/2021 |

OTHER PUBLICATIONS

Intel Corporation, "Discussion on PDSCH/PUSCH enhancements for extending NR up to 71 GHz," 3GPP TSG RAN WG1 #104-e, e-Meeting, R1-2100647, 7 pages, Jan. 25-Feb. 5, 2021.
(Continued)

*Primary Examiner* — Joseph E Avellino
*Assistant Examiner* — Anindita Sen
(74) *Attorney, Agent, or Firm* — Perkins Coie LLP

(57) ABSTRACT

Methods, apparatus, and systems that enable accurate dynamic resource indication are disclosed. In one example aspect, a method for wireless communication includes receiving, by a terminal, a first signaling message from a first network device. The first signaling message includes a time domain resource allocation (TDRA) field that maps to at least one group of time domain resource information that includes an offset for determining a first transmission resource for a first transmission between the terminal and the first network device. The method also includes performing, by the terminal, the first transmission with the first network device using the first transmission resource. a position of the first transmission resource is determined according to at least one valid slot in a plurality of slots identified using a starting point associated with the first signaling message and the offset in the first signaling message.

16 Claims, 17 Drawing Sheets

(56) References Cited

U.S. PATENT DOCUMENTS

| | | | |
|---|---|---|---|
| 2022/0053489 A1 | 2/2022 | Li et al. | |
| 2022/0312483 A1* | 9/2022 | Bae | H04L 1/08 |
| 2022/0322245 A1* | 10/2022 | Park | H04W 52/365 |
| 2023/0006798 A1* | 1/2023 | Lee | H04L 5/0055 |
| 2023/0035066 A1* | 2/2023 | Bae | H04W 72/1268 |
| 2023/0156659 A1* | 5/2023 | Li | H04W 68/02 |
| | | | 455/458 |

OTHER PUBLICATIONS

LG Electronics, "Summary #3 of PDSCH/PUSCH enhancements (Scheduling/HARQ)," 3GPP TSG RAN WG1 #104-e, e-Meeting, R1-2101972, 42 pages, Jan. 25-Feb. 5, 2021.

International Search Report and Written Opinion for International Application No. PCT/CN2021/086086, mail date Jan. 6, 2022 (8 pages).

* cited by examiner

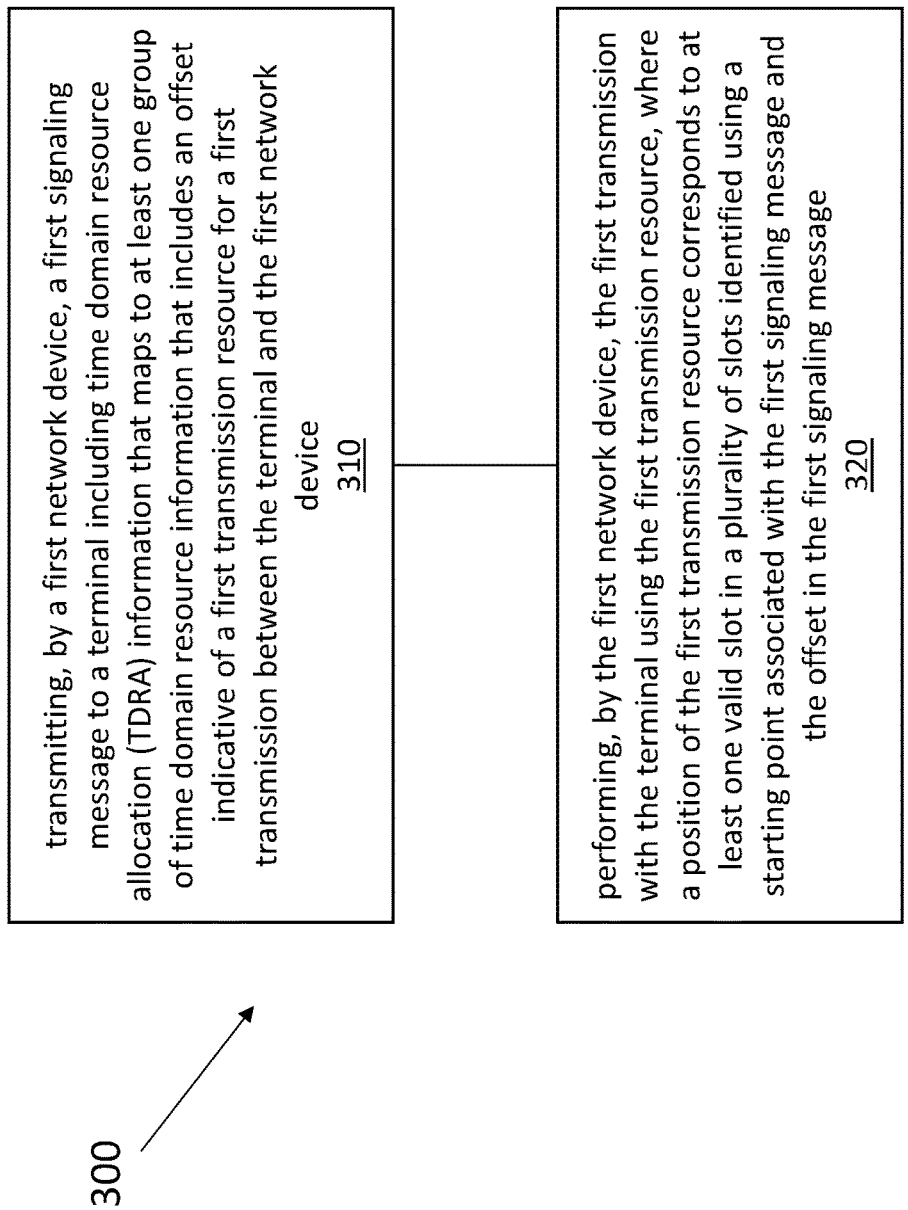

DYNAMIC RESOURCE SCHEDULING IN WIRELESS COMMUNICATIONS

CROSS REFERENCE TO RELATED APPLICATIONS

This patent document is a continuation of and claims benefit of priority to International Patent Application No. PCT/CN2021/086086, filed on Apr. 9, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that allow accurate scheduling of transmission resources when a signaling message is used to schedule one or more transmissions in one or more carriers between the base station and the mobile devices.

In one example aspect, a method for wireless communication includes receiving, by a terminal, a first signaling message from a first network device. The first signaling message includes a time domain resource allocation (TDRA) field that maps to at least one group of time domain resource information that includes an offset indicative of a first transmission resource for a first transmission between the terminal and the first network device. The method also includes performing, by the terminal, the first transmission with the first network device using the first transmission resource. A position of the first transmission resource corresponds to at least one valid slot in a plurality of slots identified using a starting point associated with the first signaling message and the offset in the first signaling message.

In another example aspect, a method for wireless communication includes transmitting, by a first network device, a first signaling message to a terminal. The first signaling message includes time domain resource allocation (TDRA) information that maps to at least one group of time domain resource information that includes an offset indicative of a first transmission resource for a first transmission between the terminal and the first network device. The method also includes performing, by the first network device, the first transmission with the terminal using the first transmission resource. A position of the first transmission resource corresponds to at least one valid slot in a plurality of slots identified using a starting point associated with the first signaling message and the offset in the first signaling message.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3 is a flowchart representation of another method for wireless communication in accordance with the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
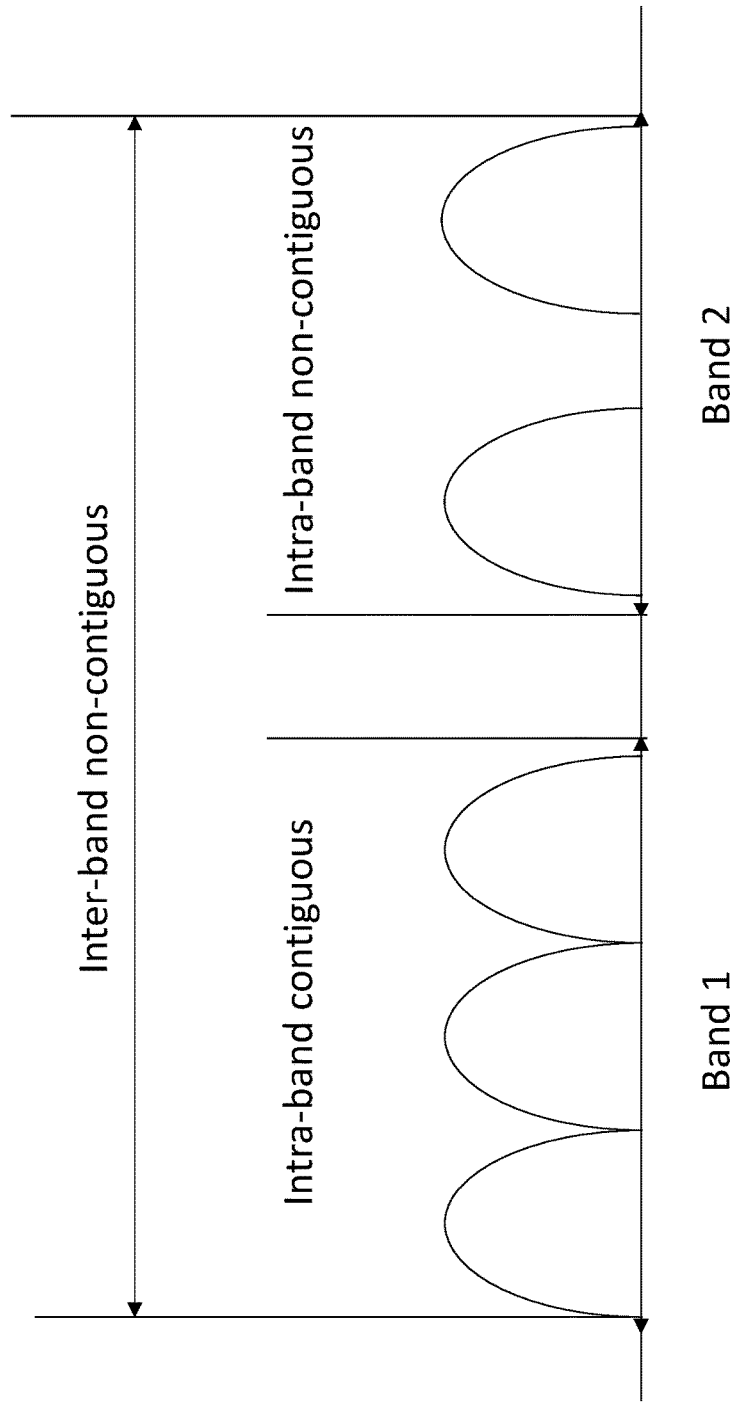
FIG. 1 illustrates example types of carrier aggregation in 5G communication systems.

Carrier aggregation (CA) is a technique used in wireless communication to increase the data rate by assigning multiple frequency blocks (referred to component carriers) to the same user. FIG. 1 illustrates example types of carrier aggregation in 5G communication systems, such as intra-band contiguous carrier aggregation, inter-band non-contiguous carrier aggregation, and inter-band non-contiguous carrier aggregation. To enable efficient CA transmissions, the Fifth Generation (5G) communication systems support various scheduling modes, including self-scheduling and inter-carrier scheduling. Self-scheduling refers to transmitting control information and data on the same component carrier (CC) or cell. Inter-carrier scheduling refers to transmitting control information sent data on different CCs or cells. To reduce the number of downlink control information (DCI) signaling messages and the physical downlink control channel (PDCCH) blocking rate, a new scheduling mode—one-scheduling-more—has been proposed in the next protocol version New Radio (NR) communication systems. One-scheduling-more mode refers to scheduling multiple physical downlink shared channels (PDSCHs) or physical uplink shared channels (PUSCHs) in different cells using a single DCI signaling.

Because the scheduling mode can change dynamically, the resources indicated in DCI signaling may not match available resources in actual CCs or cells, leading to misunderstanding between the User Equipment (UE) and the base station (e.g., gNB). This problem can be exacerbated by the one-scheduling-more mode, in which a limited number of bits (e.g., the resource allocation information in a single DCI) are used for indication in multiple cells. Furthermore, additional feedback information is needed for the one-scheduling-more mode, resulting in signaling overhead between the base station and the UE.

This patent document discloses techniques that can be implemented in various embodiments to ensure accurate indication of transmission resources, either in one-scheduling-one mode or one-scheduling-more mode for one or more carriers. The disclosed techniques can also be used to provide feedback information in one-scheduling-more mode without incurring additional signaling overhead.

Figure 2:
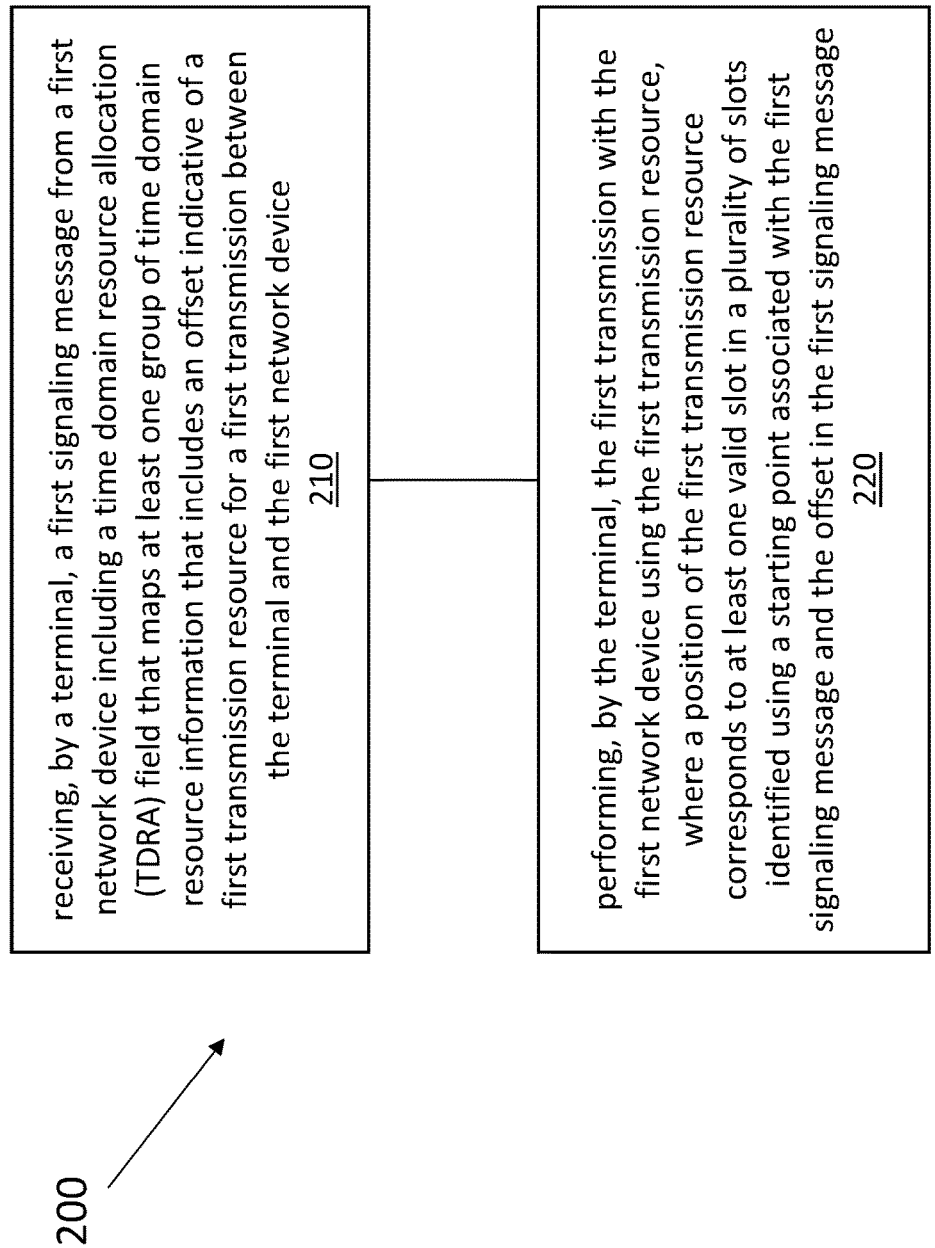
FIG. 2 is a flowchart representation of a method for wireless communication in accordance with the present technology.

FIG. 2 is a flowchart representation of a method 200 for wireless communication in accordance with the present technology. The method 200 includes, at operation 210, receiving, by a terminal, a first signaling message (e.g., a DCI signaling) from a first network device. The first signaling message includes a time domain resource allocation (TDRA) field that maps at least one group of time domain resource information that includes an offset indicative of a first transmission resource for a first transmission between the terminal and the first network device. The method 200 also includes, at operation 220, performing, by the terminal, the first transmission with the first network device using the first transmission resource. A position of the first transmission resource corresponds to at least one valid slot in a plurality of slots identified using a starting point associated with the first signaling message and the offset in the first signaling message.

FIG. 3 is a flowchart representation of a method 300 for wireless communication in accordance with the present technology. The method 300 includes, at operation 310, transmitting, by a first network device (e.g., a base station), a first signaling message to a terminal. the first signaling message includes time domain resource allocation (TDRA) information that maps to at least one group of time domain resource information that includes an offset indicative of a first transmission resource for a first transmission between the terminal and the first network device. The method 300 also includes, at operation 320, performing, by the first network device, the first transmission with the terminal using the first transmission resource. A position of the first transmission resource corresponds to at least one valid slot in a plurality of slots identified using a starting point associated with the first signaling message and the offset in the first signaling message.

In some embodiments, the first transmission is from the first network device to the terminal, and all symbols in a valid slot are downlink symbols. In some embodiments, the first transmission is from the terminal to the first network device, and all symbols in a valid slot are uplink symbols. In some embodiments, the at least one group of time domain resource information further includes a start and length indicator that indicates a start symbol in a slot allocated for the first transmission and a number of symbols allocated for the first transmission in the slot. A slot is a valid slot in case a number of continuous symbols suitable for performing the first transmission in the slot is equal to or greater than the number of symbols allocated for the first transmission. In some embodiments, the number of symbols suitable for the first transmission includes at least one flexible symbol that is usable for either a downlink or uplink transmission.

In some embodiments, a second signaling message from the first network device is used to indicate whether a flexible slot that includes at least two types of symbols is a valid slot. The least two types of symbols comprising at least two of: a downlink type, an uplink type, or a flexible type of which a symbol is usable as a downlink or an uplink symbol. In some embodiments, a second signaling message from the first network device includes a bitmap indicating whether the plurality of slots is valid or not.

In some embodiments, the first network device is in a first cell, and the starting point associated with the first signaling message and the TDRA field in the first signaling message further indicate a second transmission resource for a second transmission between the terminal and a second network device in a second cell. In some embodiments, a second position of the second transmission resource is determined by at least one valid slot in a plurality of slots in the second cell using the starting point associated with the first signaling message and the offset in the first signaling message. In some embodiments, the first cell comprises a primary cell, and the second cell comprises a secondary cell. In some embodiments, the first cell comprises a benchmark cell, and the second cell comprises another non-benchmark cell.

In some embodiments, the first signaling message includes multiple indication bits indicating time-domain or frequency-domain resource assignment for the first cell and the second cell, and the second signaling message comprises indicating whether all of the multiple indication bits are shared or used independently for the first cell and/or the second cell. In some embodiments, a frequency-domain resource granularity is determined in case a number of indication bits for a cell is less than a total number of available resource block groups (RBG) of the cell.

In some embodiments, a combined acknowledgement value for the first transmission and/or the second transmission is determined. In some embodiments, the combined acknowledgement value has 1 bit. In some embodiments, the first transmission or the second transmission is mapped to N component carriers, and the combined acknowledgement value has N bits, N being an integer greater than 1.

Some examples of the disclosed techniques are further described in the following example embodiments.

Embodiment 1

In wireless communication, the slot format indicates how each of symbols within a single slot is used. For example, if a slot is configured for downlink or uplink, all the symbols within the slot are used as downlink or uplink symbols. A slot that includes all downlink symbols can be referred to as a downlink slot. A slot that includes all uplink symbols can be referred to as an uplink slot. In NR technology, a single slot can also be divided into multiple segments of consecutive symbols that can be used for downlink, uplink, or flexible. A slot that includes at least two types of symbols can be referred to as a flexible slot. Currently, 61 predefined symbol combinations within a slot are specified in the 3GPP standard. Various methods disclosed below can be used to determine whether one or more slots are valid slot for a particular downlink or uplink transmission.

Method 1

Whether the slot is valid for a transmission can be predefined. In some embodiments, the 3GPP standard can specify whether which slot formats of the total number of predefined slot formats (e.g., 61 formats) are valid for a downlink and/or an uplink transmission. For example, for downlink transmissions, only downlink slots are predefined as valid slots. As another example, for uplink transmissions, only uplink slots are predefined as valid slots.

Method 2

In some embodiments, for a downlink transmission, if the downlink symbols in a flexible slot can continuously cover the allocated symbol time indicated in T, the flexible slot is considered as a valid slot. Otherwise, the flexible slot is invalid slot.

Figure 4A:
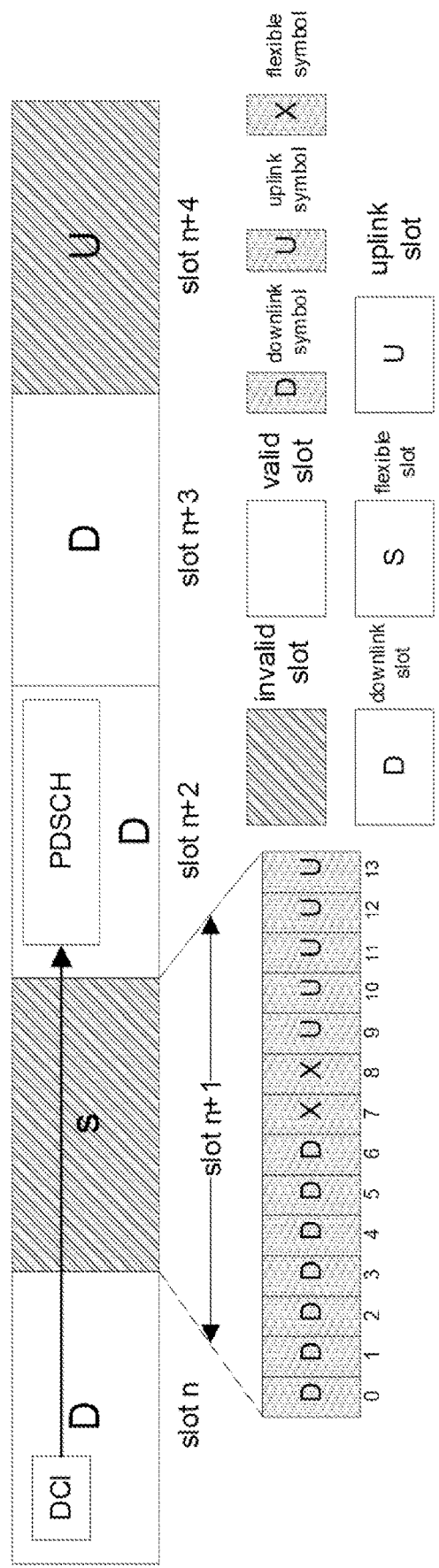
FIG. 4A illustrates an example of determining valid slots in accordance with the present technology.
Figure 4B:
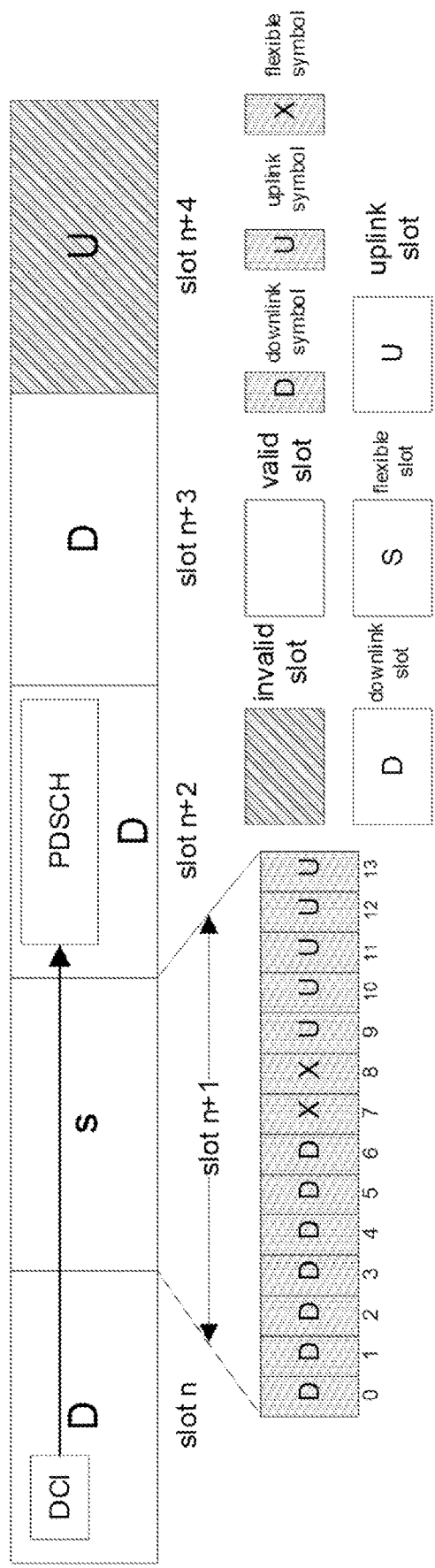
FIG. 4B illustrates another example of determining valid slots in accordance with the present technology.

For example, as shown in FIG. 4A, if the allocated symbol time indicated by T is ten symbols, the flexible slot (slot n+1) is an invalid slot for the transmission because it only includes seven downlink symbols (symbol 0-6). If the allocated symbol time indicated by T is seven symbols, then the flexible slot (slot n+1) is considered as a valid slot for the transmission as shown in FIG. 4B. It is noted that while FIGS. 4A-B illustrate a downlink transmission, the same method can be applied to uplink transmissions as well.

Method 3

In some embodiments, for a downlink transmission, if the downlink symbols and the flexible symbols in a flexible slot can continuously cover the allocated symbol time indicated in T, the flexible slot is considered as a valid slot. Otherwise, the flexible slot is invalid slot.

For example, referring to FIG. 4B again, the flexible slot (slot n+1) is a valid slot for the transmission if the allocated symbol time indicated by T is nine symbols because it includes seven downlink symbols (symbol 0-6) and two flexible symbols (symbol 7-8). If the allocated symbol time indicated by T is 10 symbols, the flexible slot (slot n+1) is an invalid slot for the transmission, such as shown in FIG. 4A. It is noted that while FIGS. 4A-B illustrate a downlink transmission, the same method can be applied to uplink transmissions as well.

Method 4

In some embodiments, the flexible slots having particular slot formats are predefined as valid slots for a downlink or an uplink transmission. When a flexible slot does not have enough symbols for a transmission as indicated by the allocated symbol duration T, the allocated symbol duration T can be adjusted according to the available downlink or uplink symbols to ensure that the flexible slot is a valid slot. For example, as shown in FIG. 4A the downlink symbols in the flexible slot cannot continuously cover the allocated symbol time indicated in T of 10 symbols. The UE can consider the allocated time symbol to be updated to symbols 0-6 to use all the downlink symbols for the transmission.

Method 5

When a flexible slot does not have enough symbols for a transmission as indicated by the allocated symbol duration T, the allocated symbol duration T can be adjusted according to the available downlink and flexible symbols, or the available uplink and flexible symbols to ensure that the flexible slot is a valid slot. For example, as shown in FIG. 4A the downlink symbols in the flexible slot cannot continuously cover the allocated symbol time indicated in T of 10 symbols. The UE can consider the allocated time symbol to be updated to symbols 0-8 to use all the downlink symbols and flexible symbols for the transmission.

Method 6

In some embodiments, a higher layer signaling (e.g., Radio Resource Configuration signaling) can be used to indicate whether particular slot formats are valid or invalid for a transmission. For example, the RRC signaling can indicate, explicitly or implicitly, whether a flexible slot is valid or not for the transmission. In some embodiments, the RRC signaling can include an explicit indication bit. When the indication bit is equal to 1, the corresponding flexible slot is considered as a valid slot. Otherwise, the flexible slot is considered as invalid. In some embodiments, existing fields in the RRC signaling can be used to implicitly indicate whether a flexible slot is valid or not.

Method 7

In some embodiments, the higher layer signaling is used to indicate whether particular slots or slot types are valid for the transmission. The higher layer signaling can include multiple bits (e.g., a bitmap) to indicate whether one or more slots (downlink, uplink, and/or flexible) are valid or not for the transmission. For example, referring to FIG. 4A, an RRC signaling message can include a bitmap of 10110 to indicate that slot n+1 and slot n+4 are invalid, where the value of 1 indicates that the corresponding slot is valid and the value of 0 indicates that the corresponding slot is invalid. As another example, referring to FIG. 4B, an RRC signaling message can include a bitmap of 11110 to indicate that slot n+4 is invalid.

Method 8

In some embodiments, for a downlink transmission, the downlink slots are predefined as valid slots while the uplink slots are predefined as invalid slot, and for an uplink transmission, the uplink slots are predefined as valid slots while the downlink slots are predefined as invalid slots. The higher layer signaling can be used to indicate whether flexible slots are valid or not for transmissions. In some embodiments, flexible slots are sorted in an ascending or descending order, each corresponding to a bit position. The RRC signaling can include a bitmap indicating whether the corresponding flexible slots are valid or not. For example, as shown in FIGS. 4A-B, there is only one flexible slot that needs indication by the RRC signaling. The RRC signaling can use a bitmap that includes one bit to indicate whether the flexible slot is valid or not.

Method 9

In some embodiments, for a downlink transmission, the downlink slots are predefined as valid slots while the uplink slots are predefined as invalid slot, and for an uplink transmission, the uplink slots are predefined as valid slots while the downlink slots are predefined as invalid slots. The higher layer signaling can be used to indicate whether flexible slots are valid or not for transmissions. In some embodiments, all flexible slots correspond to one bit. The RRC signaling can include one bit indicating whether the all flexible slots are valid or not. For example, the value of 1 indicates that all flexible slots are valid and the value of 0 indicates that all flexible slots are invalid.

Embodiment 2

In some embodiments, the determining the position of the first transmission resource as shown in FIG. 2 includes determining that the at least one slot in the plurality of slots is valid for the first transmission and remaining slots are invalid for the first transmission and counting an offset number of valid slots starting from the starting point associated with the first signaling message.

For dynamic scheduling, the base station (e.g., gNB) sends a DCI message to the UE. The UE is scheduled to receive at least one PDSCH in at least one cell. The UE determines a row index value according to the indication bit in the TDRA in DCI, which maps to a row of information (e.g., corresponding to a group of time domain resource information) in an allocation table. The indexed row of information includes at least a slot offset value $K_0$. The allocated slot for the PDSCH Ks is determined based on a variable N and $K_0$, where the value of N is at least determined by the index of the slot of the scheduling DCI, the subcarrier spacing configurations for PDSCH, and the subcarrier spacing configurations for PDCCH. The UE can use one or more of the following methods to determine the time-domain position of the allocated resource.

Method 1

When a transmission on a cell is scheduled based on a DCI, only the slots in the cell that are valid for performing the transmission are counted for the purpose of determining the allocated resources.

Figure 5A:
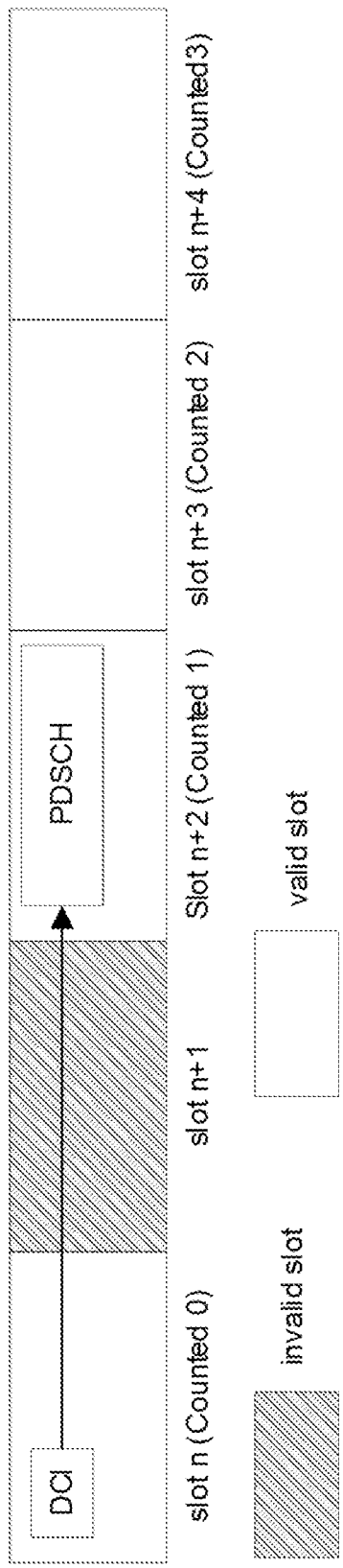
FIG. 5A illustrates an example of determining a slot for a downlink transmission resource in accordance with the present technology.

FIG. 5A illustrates an example of determining the slot for the downlink transmission resource in accordance with the present technology. The gNB sends a single DCI to schedule one downlink transmission on the PDSCH. In this example, the UE knows $K_0=1$ and N=n according to the DCI and the information included in the DCI. The UE determines that slots n, n+2, n+3, and n+4 are valid for the downlink transmission while slot n+1 is invalid. Accordingly, slot n+2 is determined to be the allocated resource by counting $K_s=N+K_0$ valid slots.

Figure 5B:
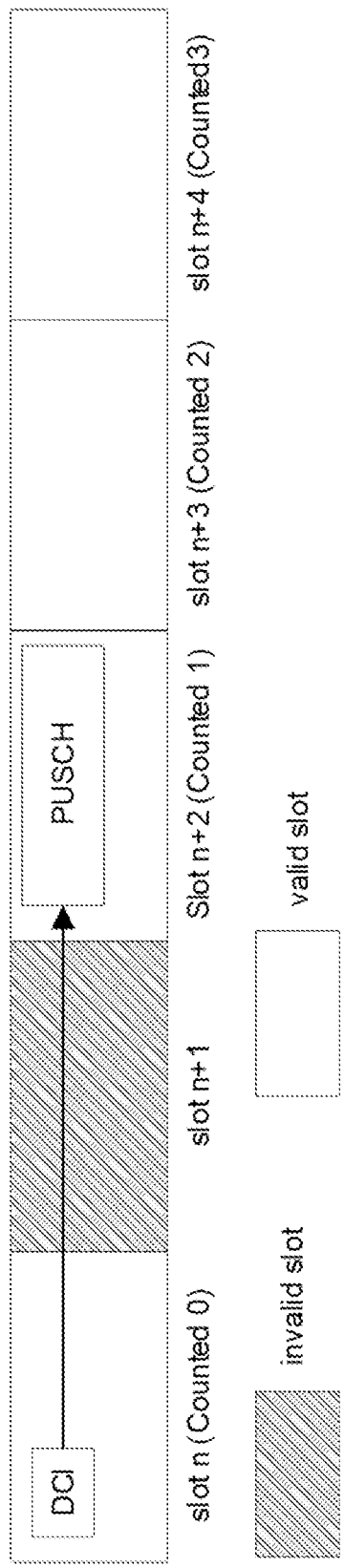
FIG. 5B illustrates an example of determining a slot for an uplink transmission resource in accordance with the present technology.

FIG. 5B illustrates an example of a DCI signaling that schedules a PUSCH transmission. The gNB sends a single DCI to schedule one downlink transmission on the PUSCH. In this example, the UE knows $K_0=1$ and N=n according to the DCI and the information included in the DCI. The UE determines that slots n, n+2, n+3, and n+4 are valid for the uplink transmission while slot n+1 is invalid. Accordingly, slot n+2 is determined to be the allocated resource by counting $K_s=N+K_0$ valid slots.

Method 2

Transmissions on at least two cells can be scheduled based on a single DCI. In some embodiments, one cell can be the primary cell (PCell), and the remaining cell(s) can be secondary cell(s) (SCell(s)). In each cell, only the slots that are valid for performing the transmission are counted for the purpose of determining the allocated resources.

Figure 6A:
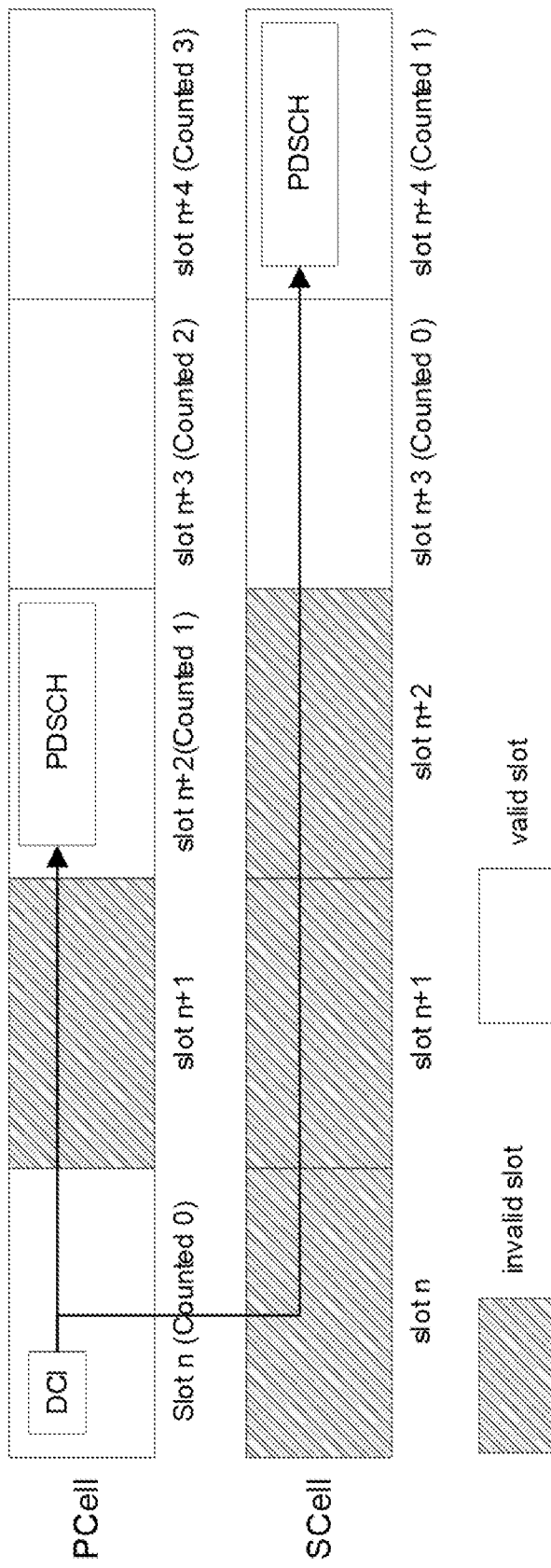
FIG. 6A illustrates another example of determining a slot for a downlink transmission resource in accordance with the present technology.

FIG. 6A illustrates an example of a signaling message (e.g., DCI) that schedules two downlink transmissions (e.g., on PDSCH) in accordance with the present technology. The gNB sends a single DCI to schedule two PDSCHs on the PCell and SCell. In this example, the UE knows $K_0=1$ and N=n according to the DCI and the information included in the DCI. The UE in the PCell determines that slots n, n+2, n+3, and n+4 are valid while slot n+1 is invalid. The UE in the SCell determines that slots n+3 and n+4 are valid while slots n, n+1, n+2 are invalid. Accordingly, slot n+2 in the PCell and slot+4 in the SCell are determined to be the allocated resource in respective cells by counting $K_s=N+K_0$ valid slots.

Figure 6B:
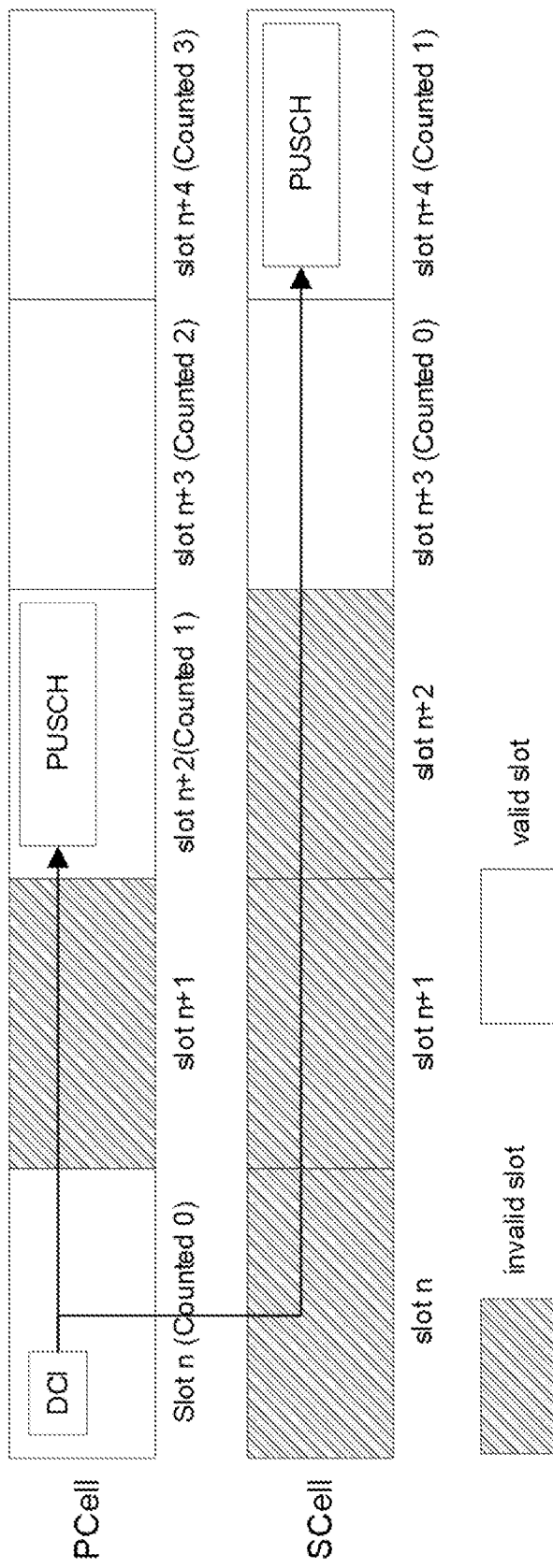
FIG. 6B illustrates another example of determining a slot for an uplink transmission resource in accordance with the present technology.

FIG. 6B illustrates an example of a signaling message (e.g., DCI) that schedules two uplink transmissions (e.g., on PUSCH) in accordance with the present technology. The gNB sends a single DCI to schedule two PUSCHs on the PCell and SCell. In this example, the UE knows $K_0=1$ and N=n according to the DCI and the information included in the DCI. The UE in the PCell determines that slots n, n+2, n+3, and n+4 are valid while slot n+1 is invalid. The UE in the SCell determines that slots n+3 and n+4 are valid while slots n, n+1, n+2 are invalid. Accordingly, slot n+2 in the PCell and slot+4 in the SCell are determined to be the allocated resource in respective cells by counting $K_s=N+K_0$ valid slots.

Method 3

Transmissions on at least two cells can be scheduled based on a single DCI. In some embodiments, one cell can be the primary cell (PCell), and the remaining cell(s) can be secondary cell(s) (SCell(s)). When transmissions on at least two cells are scheduled based on a single DCI, invalid slots are only considered in some of the cells. That is, all the slots in one of the cells (e.g., PCell or SCell) are considered as valid for the transmission for the purpose of determining the allocated resources.

Figure 7A:
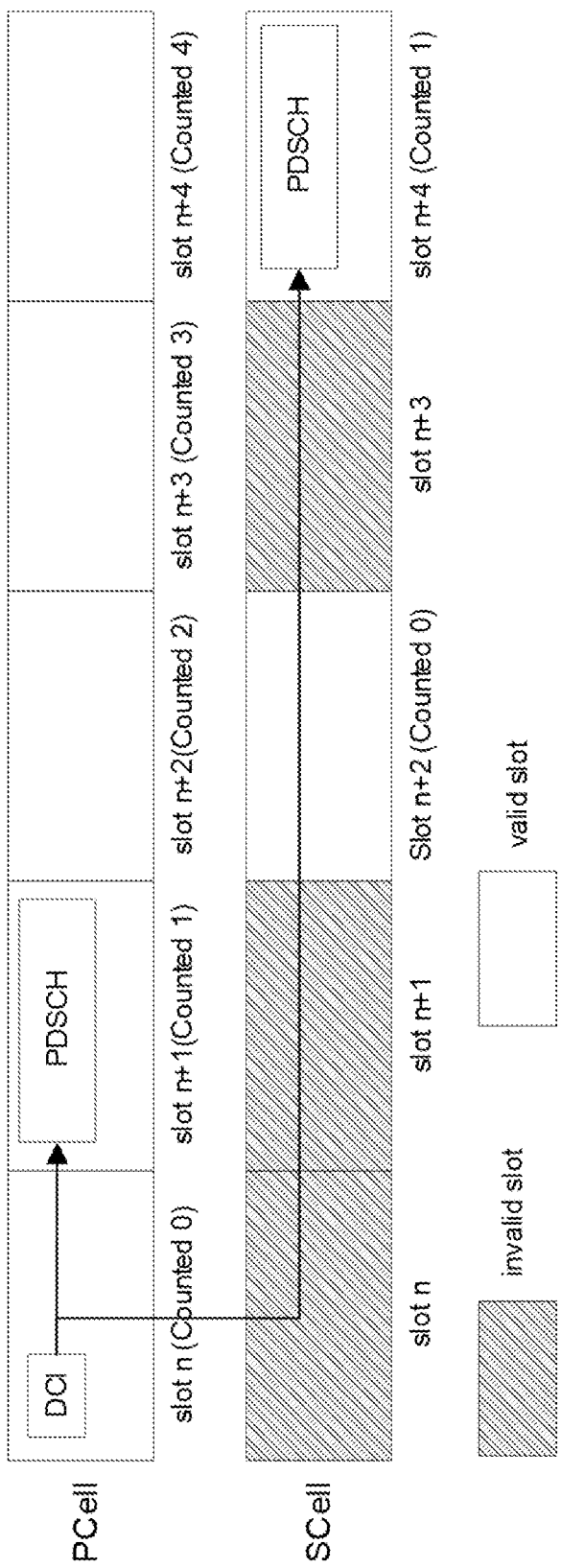
FIG. 7A illustrates another example of determining a slot for a downlink transmission resource in accordance with the present technology.

FIG. 7A illustrates an example of a signaling message (e.g., DCI) that schedules two downlink transmissions (e.g., on PDSCH) in accordance with the present technology. The gNB sends a single DCI to schedule two PDSCHs on the PCell and SCell. In this example, the UE knows $K_0=1$ and N=n according to the DCI and the information included in the DCI. All the slots in the PCell are considered as valid slots for the purpose of determining the allocated resources. Accordingly, slot n+1 in the PCell is determined to be the allocated resource in respective cells by counting $K_s=N+K_0$ valid slots. The UE in the SCell determines that slots n+2 and n+4 are valid while slots n, n+1, n+3 are invalid. Accordingly, slot+4 in the SCell is determined to be the allocated resource in respective cells by counting $K_s=N+K_0$ valid slots.

Figure 7B:
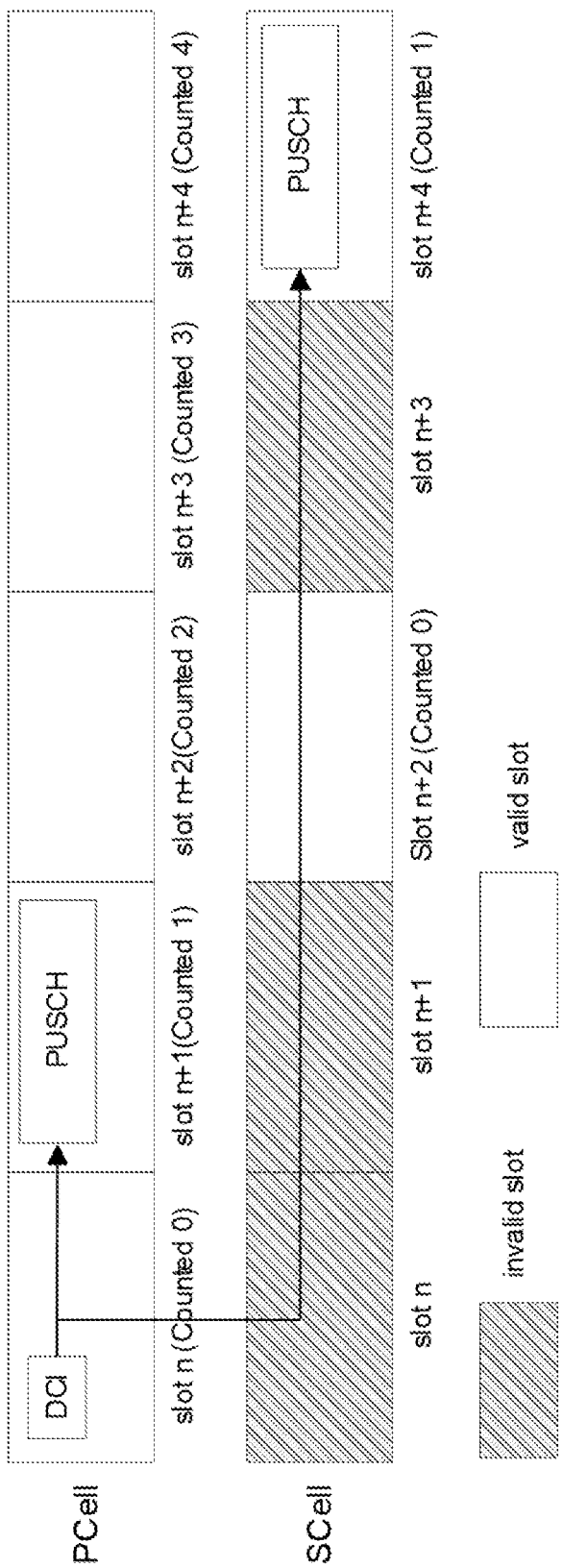
FIG. 7B illustrates another example of determining a slot for an uplink transmission resource in accordance with the present technology.

FIG. 7B illustrates an example of a signaling message (e.g., DCI) that schedules two uplink transmissions (e.g., on PUSCH) in accordance with the present technology. The gNB sends a single DCI to schedule two PUSCHs on the PCell and SCell. In this example, the UE knows $K_0=1$ and N=n according to the DCI and the information included in the DCI. All the slots in the PCell are considered as valid slots for the purpose of determining the allocated resources. Accordingly, slot n+1 in the PCell is determined to be the allocated resource in respective cells by counting $K_s=N+K_0$ valid slots. The UE in the SCell determines that slots n+2 and n+4 are valid while slots n, n+1, n+3 are invalid. Accordingly, slot+4 in the SCell is determined to be the allocated resource in respective cells by counting $K_s=N+K_0$ valid slots.

Method 4

Transmissions on at least two cells can be scheduled based on a single DCI. In some embodiments, one cell can be referred to as a benchmark cell and the remaining cell(s) can be referred to as non-benchmark cell. In each cell, only the slots that are valid for performing the transmission are counted for the purpose of determining the allocated resources.

Figure 8A:
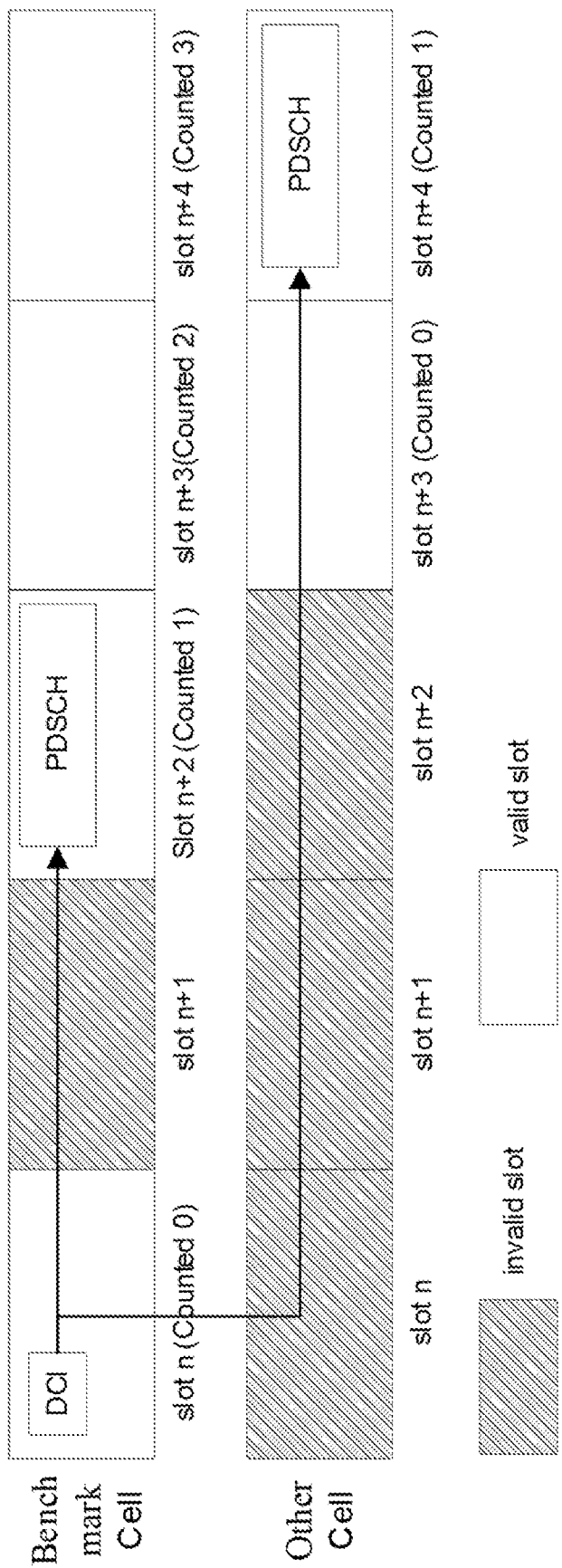
FIG. 8A illustrates another example of determining a slot for a downlink transmission resource in accordance with the present technology.

FIG. 8A illustrates an example of a signaling message (e.g., DCI) that schedules two downlink transmissions (e.g., on PDSCH) in accordance with the present technology. The gNB sends a single DCI to schedule two PDSCHs on the benchmark cell and a non-benchmark cell. In this example, the UE knows $K_0=1$ and $N=n$ according to the DCI and the information included in the DCI. The UE in the benchmark cell determines that slots n, n+2, n+3, and n+4 are valid while slot n+1 is invalid. The UE in the non-benchmark cell determines that slots n+3 and n+4 are valid while slots n, n+1, n+2 are invalid. Accordingly, slot n+2 in the benchmark and slot+4 in the non-benchmark cell are determined to be the allocated resource in respective cells by counting $K_s=N+K_0$ valid slots.

Figure 8B:
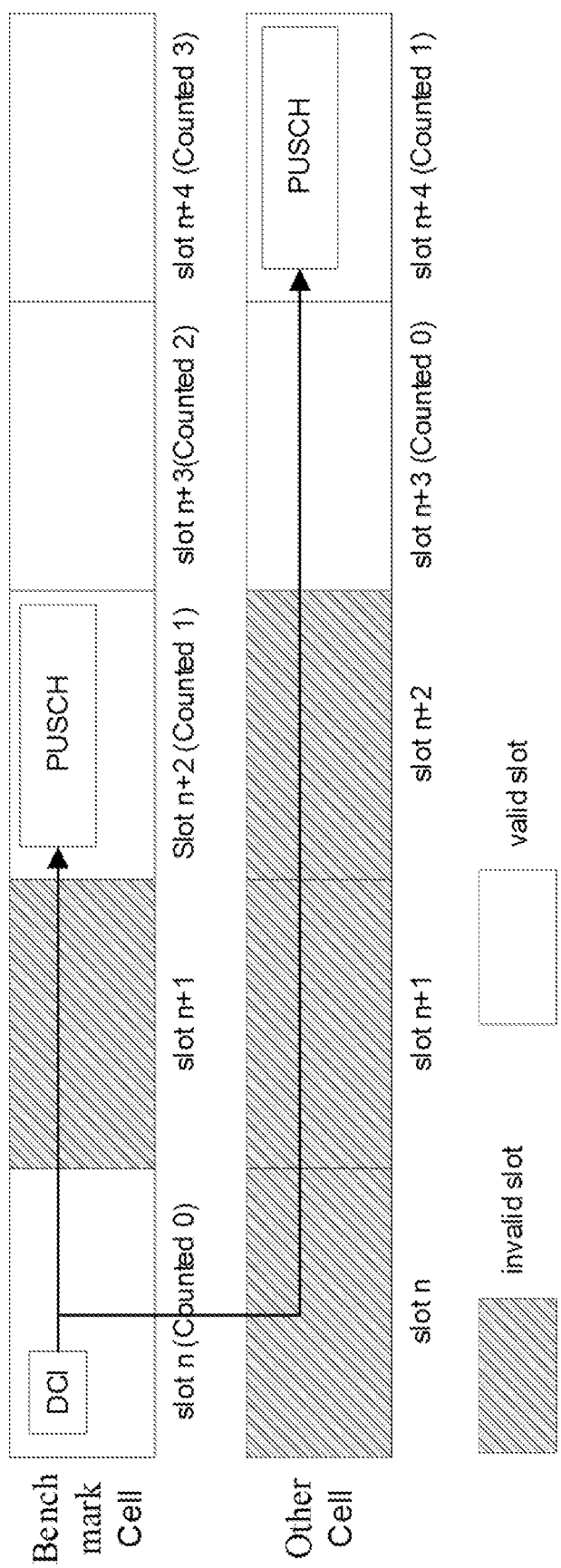
FIG. 8B illustrates another example of determining a slot for an uplink transmission resource in accordance with the present technology.

FIG. 8B illustrates an example of a signaling message (e.g., DCI) that schedules two uplink transmissions (e.g., on PUSCH) in accordance with the present technology. The gNB sends a single DCI to schedule two PUSCHs on the benchmark cell and a non-benchmark cell. In this example, the UE knows $K_0=1$ and $N=n$ according to the DCI and the information included in the DCI. The UE in the benchmark cell determines that slots n, n+2, n+3, and n+4 are valid while slot n+1 is invalid. The UE in the non-benchmark cell determines that slots n+3 and n+4 are valid while slots n, n+1, n+2 are invalid. Accordingly, slot n+2 in the benchmark cell and slot+4 in the non-benchmark cell are determined to be the allocated resource in respective cells by counting $K_s=N+K_0$ valid slots.

Method 5

Transmissions on at least two cells can be scheduled based on a single DCI. In some embodiments, one cell can be the benchmark cell, and the remaining cell(s) can be non-benchmark cells. When transmissions on at least two cells are scheduled based on a single DCI, invalid slots are only considered in some of the cells. That is, all the slots in one of the cells (e.g., the benchmark cell or a non-benchmark cell) are considered as valid for the transmission for the purpose of determining the allocated resources.

Figure 9A:
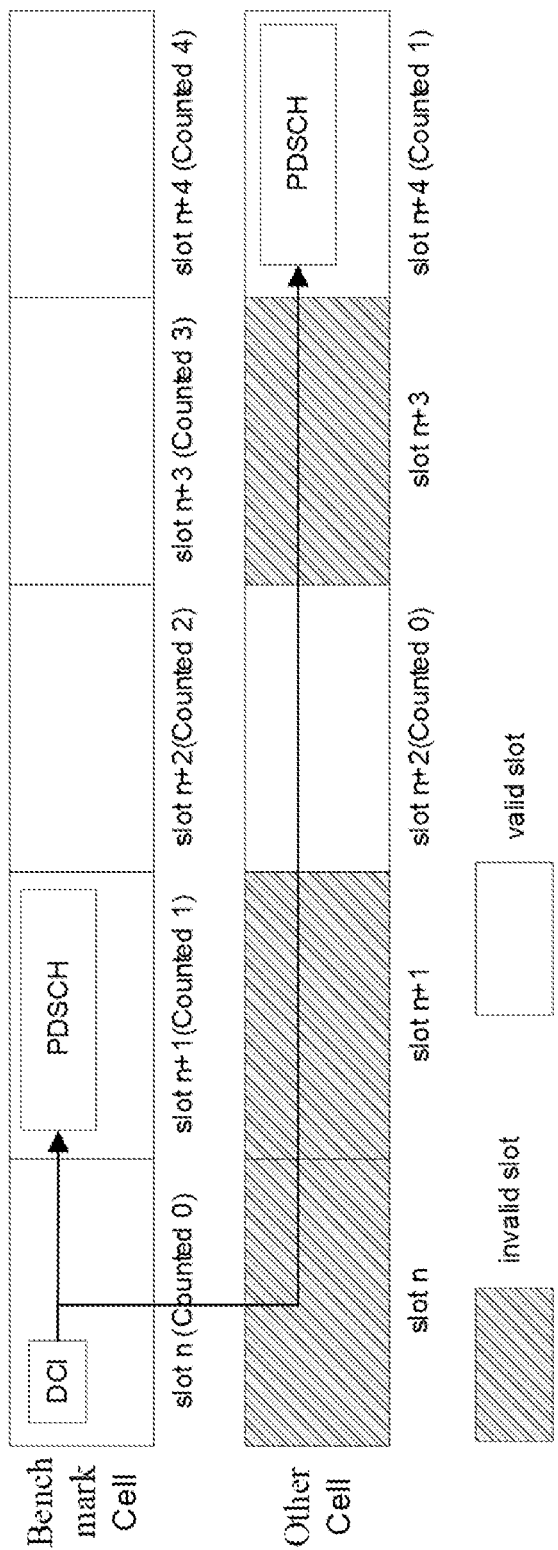
FIG. 9A illustrates yet another example of determining a slot for a downlink transmission resource in accordance with the present technology.

FIG. 9A illustrates an example of a signaling message (e.g., DCI) that schedules two downlink transmissions (e.g., on PDSCH) in accordance with the present technology. The gNB sends a single DCI to schedule two PDSCHs on the benchmark cell and a non-benchmark cell. In this example, the UE knows $K_0=1$ and $N=n$ according to the DCI and the information included in the DCI. All the slots in the benchmark cell are considered as valid slots for the purpose of determining the allocated resources. Accordingly, slot n+1 in the benchmark cell is determined to be the allocated resource in respective cells by counting $K_s=N+K_0$ valid slots. The UE in the non-benchmark cell determines that slots n+2 and n+4 are valid while slots n, n+1, n+3 are invalid. Accordingly, slot+4 in the non-benchmark cell is determined to be the allocated resource in respective cells by counting $K_s=N+K_0$ valid slots.

Figure 9B:
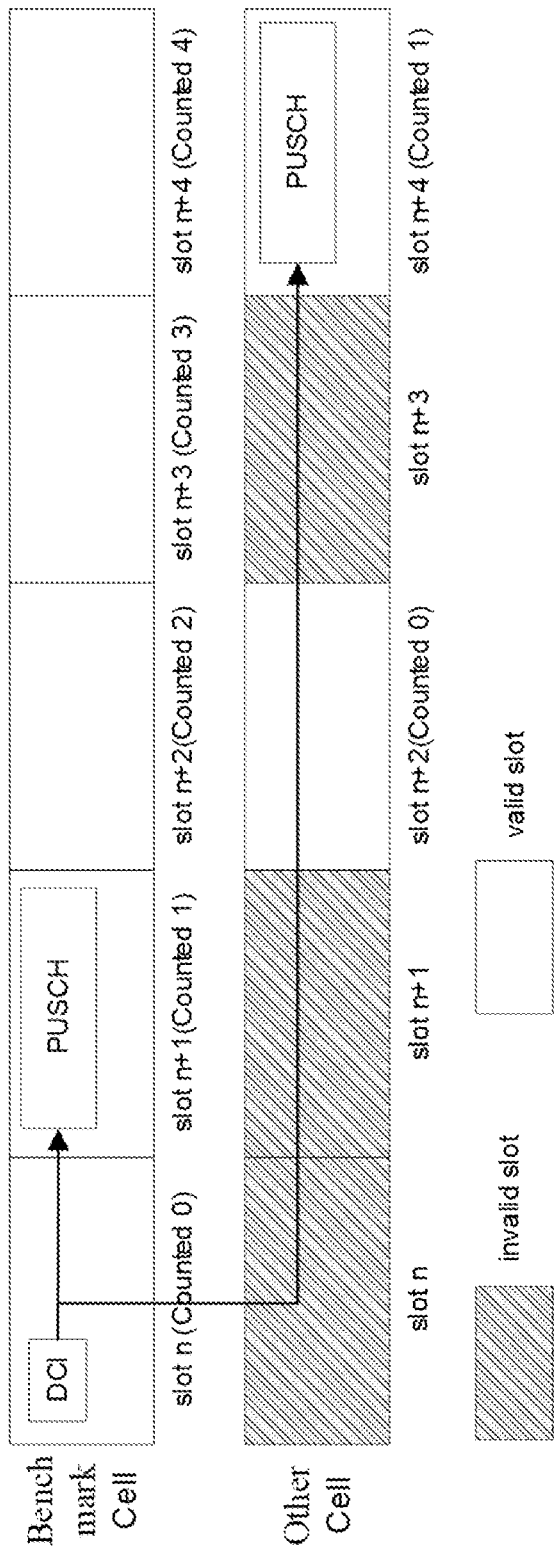
FIG. 9B illustrates yet another example of determining a slot for an uplink transmission resource in accordance with the present technology.

FIG. 9B illustrates an example of a signaling message (e.g., DCI) that schedules two uplink transmissions (e.g., on PUSCH) in accordance with the present technology. The gNB sends a single DCI to schedule two PUSCHs on the benchmark cell and a non-benchmark cell. In this example, the UE knows $K_0=1$ and $N=n$ according to the DCI and the information included in the DCI. All the slots in the benchmark cell are considered as valid slots for the purpose of determining the allocated resources. Accordingly, slot n+1 in the benchmark cell is determined to be the allocated resource in respective cells by counting $K_s=N+K_0$ valid slots. The UE in the non-benchmark cell determines that slots n+2 and n+4 are valid while slots n, n+1, n+3 are invalid. Accordingly, slot+4 in the non-benchmark cell is determined to be the allocated resource in respective cells by counting $K_s=N+K_0$ valid slots.

In the above methods, the flexible slots can be considered as valid slots first. If a flexible slot does not have sufficient symbols needed for the transmission (e.g., as described in Embodiment 1), the flexible slot is removed from the valid slots and counted as an invalid slot. Alternatively, the flexible slots are considered as invalid slots and are excluded from the counting process.

Embodiment 3

In some embodiments, the determining the position of the first transmission resource as shown in FIG. 2 includes determining that the at least one slot in the plurality of slots is valid for the first transmission and remaining slots are invalid for the first transmission, and skipping invalid slots to a next slot that is valid for the first transmission until reaching an offset number of valid slots.

As discussed above, for dynamic scheduling, the base station (e.g., gNB) sends a DCI message to the UE. The UE is scheduled to receive at least one PDSCH in at least one cell. The UE determines a row index value according to the indication bit in the TDRA in DCI. The UE can use one or more of the following methods to determine the time-domain position of the allocated resource.

Method 1

When a transmission on a cell is scheduled based on a DCI, only the slots in the cell that are valid for performing the transmission are counted for the purpose of determining the allocated resources.

Referring back to FIG. 5A, the gNB sends a single DCI to schedule one downlink transmission on the PDSCH. In this example, the UE knows $K_0=1$ and $N=n$ according to the DCI and the information included in the DCI. The UE determines that slots n is valid for the downlink transmission and skips slot n+1, which is invalid, until the next valid slot n+2. For example, slot n+1 can be a flexible slot that has an insufficient number of downlink/uplink/flexible symbols as described in Embodiment 1. As another example, if the UE cannot perform downlink or uplink transmission in slot n+1, slot n+1 and/or subsequent slots are skipped until the next slot in which the UE can perform the downlink or uplink transmission. Accordingly, slot n+2 is determined to be the allocated resource based on $K_0$ valid slots.

Referring back to FIG. 5B, the gNB sends a single DCI to schedule one uplink transmission on the PUSCH. In this example, the UE knows $K_0=1$ and $N=n$ according to the DCI and the information included in the DCI. The UE determines that slots n, is valid for the downlink transmission and skips slot n+1, which is invalid, until the next valid slot n+2. For example, slot n+1 can be a flexible slot that has an insufficient number of downlink/uplink/flexible symbols as described in Embodiment 1. As another example, if the UE cannot perform downlink or uplink transmission in slot n+1, slot n+1 and/or subsequent slots are skipped until the next slot in which the UE can perform the downlink or uplink transmission. Accordingly, slot n+2 is determined to be the allocated resource based on $K_0$ valid slots.

Method 2

Transmissions on at least two cells can be scheduled based on a single DCI. In some embodiments, one cell can be the PCell or a benchmark cell, and the remaining cell(s) can be SCells or non-benchmark cells. In each cell, slots that are invalid for performing the transmission are skipped for the purpose of determining the allocated resources.

Referring back to FIGS. 6A-B and FIGS. 8A-B, the gNB sends a single DCI to schedule two PDSCHs on the PCell/benchmark Cell and SCell/non-benchmark cell. In this example, the UE knows $K_0=1$ and $N=n$ according to the DCI and the information included in the DCI. The UE in the PCell/benchmark cell determines that slot n is valid and skips slot n+1, which is invalid, until the next valid slot n+2. The UE in the SCell/non-benchmark cell skips slots n to n+1 until valid slots n+3 and n+4. Accordingly, slot n+2 in the PCell/benchmark cell and slot+4 in the SCell/non-benchmark shell are determined to be the allocated resource in respective cells by counting $K_s=N+K_0$ valid slots.

Method 3

Transmissions on at least two cells can be scheduled based on a single DCI. In some embodiments, one cell can be the PCell or a benchmark cell, and the remaining cell(s) can be SCells or non-benchmark cells. In a subset of the cells, slots that are invalid for performing the transmission are skipped for the purpose of determining the allocated resources.

Referring back to FIGS. 7A-B and FIGS. 9A-B, the gNB sends a single DCI to schedule two PDSCHs on the PCell/benchmark Cell and SCell/non-benchmark cell. In this example, the UE knows $K_0=1$ and $N=n$ according to the DCI and the information included in the DCI. All the slots in the PCell/benchmark cell are considered as valid slots for the purpose of determining the allocated resources. Accordingly, slot n+1 in the PCell/benchmark cell is determined to be the allocated resource in respective cells based on $K_0$. The UE in the SCell/non-benchmark cell determines that slots n to n+1 are skipped until slot n+2, which is a valid slot. Based on $K_0$, the UE continue to evaluate slot n+3 and decides to skip slot n+3 until slot n+4. Accordingly, slot+4 in the SCell/non-benchmark cell is determined to be the allocated resource in respective cells based on $K_0$ valid slots.

Embodiment 4

In some embodiments, the downlink or uplink transmission scheduled by the DCI can be in the same cell with the PDCCH carrying DCI, or in different cells with the PDCCH carrying DCI. The DCI includes a resource indication field that indicates the resource for at least one cell. The following method describe how the bits of the resource indication field are used to indicate resource information for different cells.

Method 1

The resource indication bits can be evenly divided into independent indications according to the number of cells. For example, if there are 6 bits for the resource indication field and the number of scheduled cells is two, the first three bits can be used to indicate information for cell 1 and the last three bits can be used to indicate information for cell 2.

Method 2

The resource indication bits can be shared by different cells. For example, the resource indication field includes 6 bits and the number of scheduled cells is two. Information included in the 6 bits are applicable to both of the scheduled cells respectively.

Method 3

In some embodiments, a higher layer signaling (e.g., RRC or Medium Access Control layer) can be used to indicate whether the bits in the resource indication field are shared among the cells or divided into independent subgroups of bits. For example, a higher layer signaling can include a bit indicating which of the two method is used.

Embodiment 5

The resource indication field includes bit indicating the time-domain and frequency-domain resource allocation for the transmission.

Method 1

In some embodiments, the number of frequency domain indication bits in resource indication field m is less than the total number N of available resource block groups (RBG). The resource indication field can include information bits that indicates the first or last m RBGs for the transmission.

Method 2

In some embodiments, if the number of frequency domain indication bits in resource indication field m is less than the total number N of available resource block groups (RBG), the size and number of RBG are re-determined as having a different granularity. For example, the total number RBG is m. The first $$m - N_{BWP} + \left\lfloor \frac{N_{BWP}}{m} \right\rfloor \times mRBGs$$

includes $$\left\lfloor \frac{N_{BWP}}{m} \right\rfloor RBs$$

and each of the remaining $$N_{BWP} - \left\lfloor \frac{N_{BWP}}{m} \right\rfloor \times mRBGs \text{ includes } \left\lceil \frac{N_{BWP}}{m} \right\rceil RBs.$$

Embodiment 6

This embodiment describes a Downlink Assignment Indication field in the DCI signaling, and example feedback generated when one DCI signaling schedules multiple transmissions.

In some embodiments, two types of DCI signaling can be used. The first type of DCI signaling is used to schedule at least two transmissions, and the transmissions scheduled by the first type DCI use the same transmission block (TB) in different cells. The second type of DCI signaling is used to schedule a single transmission. During the scheduling process, the base station sends a DCI signaling to the first communication node. The DCI signaling includes a DAI field that further includes a count DAI (C-DAI) value and total DAI (T-DAI) value. The C-DAI value indicates the number of transmissions (e.g., PDSCH transmissions) that need to be fed back in the same feedback codebook until the current DCI is received. The T-DAI value indicates the total number of transmissions that need to be fed back in the same feedback codebook when the current monitoring occasion is reached.

The mobile device/UE generates the corresponding feedback codebook according to the C-DAI and T-DAI values in the DAI field included in the DCI signaling. For example, by receiving the current DCI, the number of PDSCHs to be fed back in the same feedback codebook is 3. The total number of PDSCHs to be fed back in the same feedback codebook is 10 for the current monitoring occasion. The C-DAI value and T-DAI values of the first type of DCI signaling and the second type of DCI signaling can be independent or shared. Take T-DAI value as an example, the T-DAI value in the first type of DCI signaling is 3 while the T-DAI value in the second type of DCI signaling 4. When two types of DCI are counted separately, the T-DAI values of the two types of DCI are 3 and 4, respectively. When two types of DCI share the T-DAI value, the T-DAI value of the two types of DCI is 7.

When the first type of DCI signaling includes a group of C-DAI values and T-DAI values, the carrier in which one of PDSCHs scheduled by the first type DCI is used as the reference carrier, and the C-DAI value and T-DAI value is determined according to the number of PDSCH transmissions scheduled by the first type DCI. When the first type DCI only includes one group of C-DAI and T-DAI value, all the PDSCH transmissions scheduled by the first type of DCI signaling share the same C-DAI and T-DAI values. In addition, this group of C-DAI and T-DAI value is represented by one of PDSCHs scheduled by the first type of DCI signaling. For example, assume that the first type of DCI signaling schedules three PDSCHs, and the three PDSCHs share a group of C-DAI and T-DAI value. One of the three PDSCHs can be used to represent this group of C-DAI and T-DAI value.

When DCI is the first type of DCI signaling that includes a group of C-DAI value and T-DAI value, the codebook generation method includes at least one of the following methods.

Method 1

In this method, the C-DAI is counted for each DCI signaling once. That is, the DAI value is incremented by one when the first type of DCI signaling is sent or received. The first communication node (e.g. the UE) generates a 1-bit HARQ-ACK for each PDSCH scheduled by the first type of DCI signaling. All HARQ-ACK values are combined into 1 bit, corresponding to 1 bit in the codebook. The HARQ-ACK values can be merged using a logical OR operation for all generated HARQ-ACK values.

Method 2

In this method, the C-DAI is counted for each DCI signaling once. That is, the DAI value is incremented by one when the first type of DCI signaling is sent or received. The first communication node (e.g., the UE) generates a 1-bit HARQ-ACK corresponding to 1 bit in the codebook for all PDSCHs scheduled by the first type of DCI signaling. If all of the PDSCH transmissions are not decoded or received successfully, NACK is returned. Otherwise, ACK is returned.

Method 3

In this method, the C-DAI is counted for each DCI signaling once. That is, the DAI value is incremented by one when the first type of DCI signaling is sent or received. The first communication node (e.g., the UE) generates a 1-bit HARQ-ACK corresponding to 1 bit in the codebook for all PDSCH transmissions scheduled by the first type DCI. If all of the PDSCH transmissions are combined but the combination is not decoded correctly or lost, NACK is returned. Otherwise, ACK is returned.

Embodiment 7

This embodiment describes another example of feedback generated when one DCI signaling schedules multiple transmissions.

In some embodiments, the DCI signaling includes two types: the first type of DCI signaling is used to schedule one transmission on the PDSCH that is mapped to n component carriers (CCs). The second type of DCI signaling is used to schedule one PDSCH transmission that is mapped to 1 CC. During the scheduling process, the second communication node (e.g., the base station) sends a DCI signaling to the first communication node (e.g., the UE). When the first type of DCI signaling includes a group of C-DAI and T-DAI values, the codebook generation method includes at least one of the following methods.

Method 1

In this method, the C-DAI is counted for each DCI signaling once. That is, the DAI value is incremented by one when the first type of DCI signaling is sent or received. The first communication node (e.g., the UE) generates a 1-bit HARQ-ACK corresponding to 1 bit in the codebook for the PDSCH scheduled by the first type DCI. If all PDSCHs are combined but the combination is not decoded correctly or lost, NACK is returned. Otherwise, ACK is returned.

Method 2

In this method, the C-DAI is counted n times for each DCI signaling once. That is, the DAI value is incremented by n when the first type of DCI signaling is sent or received. The first communication node (e.g., the UE) generates n bits HARQ-ACK corresponding to n bit in the codebook for all PDSCHs scheduled by the first type DCI.

Figure 10:
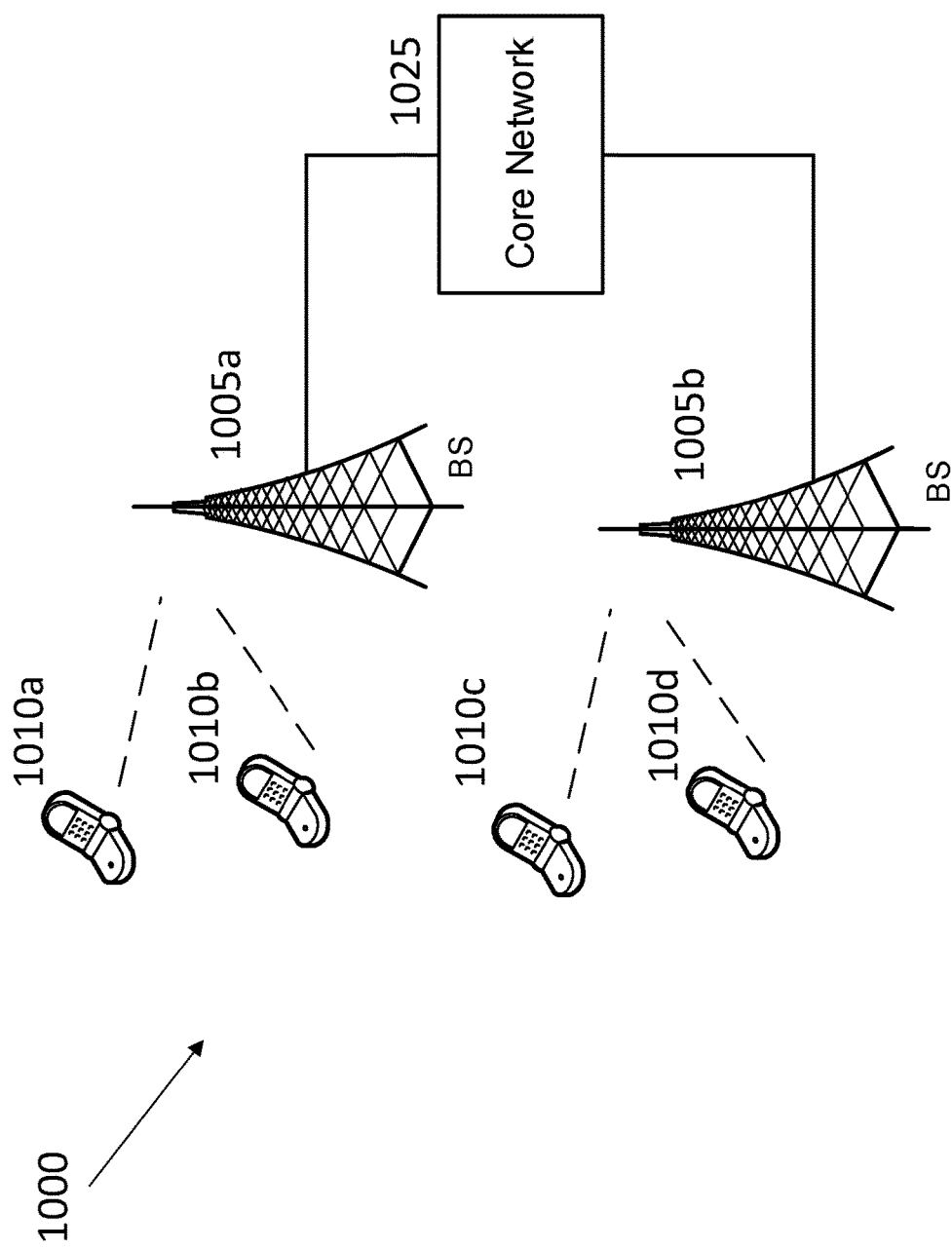
FIG. 10 shows an example of a wireless communication system where techniques in accordance with one or more embodiments of the present technology can be applied.

FIG. 10 shows an example of a wireless communication system 1000 where techniques in accordance with one or more embodiments of the present technology can be applied. A wireless communication system 1000 can include one or more base stations (BSs) 1005*a*, 1005*b*, one or more wireless devices 1010*a*, 1010*b*, 1010*c*, 1010*d*, and a core network 1025. A base station 1005*a*, 1005*b* can provide wireless service to wireless devices 1010*a*, 1010*b*, 1010*c* and 1010*d* in one or more wireless sectors. In some implementations, a base station 1005*a*, 1005*b* includes directional antennas to produce two or more directional beams to provide wireless coverage in different sectors.

The core network 1025 can communicate with one or more base stations 1005*a*, 1005*b*. The core network 1025 provides connectivity with other wireless communication systems and wired communication systems. The core network may include one or more service subscription databases to store information related to the subscribed wireless devices 1010*a*, 1010*b*, 1010*c*, and 1010*d*. A first base station 1005*a* can provide wireless service based on a first radio access technology, whereas a second base station 1005*b* can provide wireless service based on a second radio access technology. The base stations 1005*a* and 1005*b* may be co-located or may be separately installed in the field according to the deployment scenario. The wireless devices 1010*a*, 1010*b*, 1010*c*, and 1010*d* can support multiple different radio access technologies. The techniques and embodiments described in the present document may be implemented by the base stations of wireless devices described in the present document.

Figure 11:
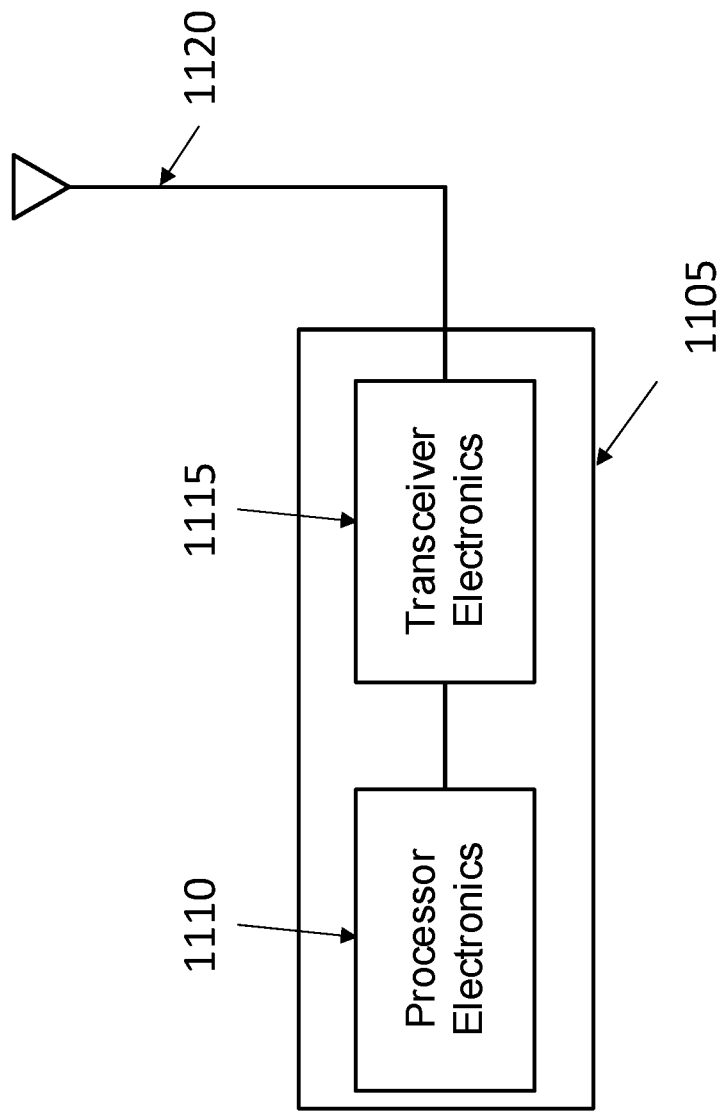
FIG. 11 is a block diagram representation of a portion of a radio station in accordance with one or more embodiments of the present technology can be applied.

FIG. 11 is a block diagram representation of a portion of a radio station in accordance with one or more embodiments of the present technology can be applied. A radio station 1105 such as a base station or a wireless device (or wireless device) can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105. In some embodiments, the radio station 1105 may be configured to perform the methods described herein.

It will be appreciated that the present document discloses techniques that can be embodied in various embodiments to schedule related data transmissions across multiple cells and/or carriers so as to minimize scheduling delay. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal, a first signaling message from a first network device, wherein the first signaling message includes a time domain resource allocation (TDRA) field that maps to at least one group of time domain resource information that includes an offset indicative of a first transmission resource for a first transmission between the terminal and the first network device, wherein the TDRA field includes a start and length indicator that indicates a start symbol in a slot allocated for the first transmission and a number of symbols allocated for the first transmission in the slot, and wherein a slot is a valid slot in case a number of continuous symbols suitable for performing the first transmission in the slot is equal to or greater than the number of symbols allocated for the first transmission; and performing, by the terminal, the first transmission with the first network device using the first transmission resource, wherein a position of the first transmission resource corresponds to at least one valid slot in a plurality of slots identified using a starting point associated with the first signaling message and the offset in the first signaling message, wherein the first network device is in a first cell, and wherein the starting point associated with the first signaling message and the TDRA field in the first signaling message further indicate a second transmission resource for a second transmission between the terminal and a second network device in a second cell, wherein the first cell comprises a primary cell, and wherein the second cell comprises a secondary cell, the method further comprising:

determining, by the terminal, a second position of the second transmission resource by determining at least one valid slot in a plurality of slots in the second cell using the starting point associated with the first signaling message and the offset in the first signaling message.

2. The method of claim 1, wherein the number of symbols suitable for the first transmission includes at least one flexible symbol that is usable for either a downlink transmission or an uplink transmission.

3. The method of claim 1, comprising:
receiving, by the terminal, a second signaling message from the first network device indicating whether a flexible slot that includes at least two types of symbols is a valid slot, the at least two types of symbols comprising at least two of: a downlink type, an uplink type, or a flexible type of which a symbol is usable as a downlink symbol or an uplink symbol.

4. The method of claim 1, wherein the first signaling message includes multiple indication bits indicating a time-domain or frequency-domain resource assignment for the first cell and the second cell, and wherein the second signaling message comprises information indicating whether all of the multiple indication bits are shared by the first cell and the second cell or used independently by the first cell or the second cell.

5. The method of claim 4, further comprising:
determining a frequency-domain resource granularity in case a number of indication bits for a cell is less than a total number of available resource block groups (RBG) of the cell.

6. A method for wireless communication, comprising:
transmitting, by a first network device, a first signaling message to a terminal, wherein the first signaling message includes a time domain resource allocation (TDRA) field that maps to at least one group of time domain resource information that includes an offset indicative of a first transmission resource for a first transmission between the terminal and the first network device, wherein the TDRA field includes a start and length indicator that indicates a start symbol in a slot allocated for the first transmission and a number of symbols allocated for the first transmission in the slot, and wherein a slot is a valid slot in case a number of continuous symbols suitable for performing the first transmission in the slot is equal to or greater than the number of symbols allocated for the first transmission; and performing, by the first network device, the first transmission with the terminal using the first transmission resource, wherein a position of the first transmission resource corresponds to at least one valid slot in a plurality of slots identified using a starting point associated with the first signaling message and the offset in the first signaling message, wherein the first network device is in a first cell, and wherein the starting point associated with the first signaling message and the TDRA field in the first signaling message further indicate a second transmission resource for a second transmission between the terminal and a second network device in a second cell, wherein the first cell comprises a primary cell, and wherein the second cell comprises a secondary cell, and wherein a second position of the second transmission resource is determined by at least one valid slot in a plurality of slots in the second cell using the starting point associated with the first signaling message and the offset in the first signaling message.

7. The method of claim 6, wherein the number of symbols suitable for the first transmission includes at least one flexible symbol that is usable for either a downlink or uplink transmission.

8. The method of claim 6, comprising:
transmitting, by the first network device, a second signaling message to the terminal indicating whether a flexible slot that includes at least two types of symbols is a valid slot, the at least two types of symbols comprising at least two of: a downlink type, an uplink type, or a flexible type of which a symbol is usable as a downlink or an uplink symbol.

9. The method of claim 6, wherein the first signaling message includes multiple indication bits indicating a time-domain or frequency-domain resource assignment for the first cell and the second cell, and wherein the second signaling message comprises indicating whether all of the multiple indication bits are shared by the first cell and the second cell or used independently by the first cell or the second cell.

10. The method of claim 6, further comprising:
determining a frequency-domain resource granularity in case a number of indication bits for a cell is less than a total number of available resource block groups (RBG) of the cell.

11. A communication apparatus, comprising a processor that is configured to:
receive a first signaling message from a first network device, wherein the first signaling message includes a time domain resource allocation (TDRA) field that maps to at least one group of time domain resource information that includes an offset indicative of a first transmission resource for a first transmission between the communication apparatus and the first network device, wherein the TDRA field includes a start and length indicator that indicates a start symbol in a slot allocated for the first transmission and a number of symbols allocated for the first transmission in the slot, and wherein a slot is a valid slot in case a number of continuous symbols suitable for performing the first transmission in the slot is equal to or greater than the number of symbols allocated for the first transmission; and perform the first transmission with the first network device using the first transmission resource, wherein a position of the first transmission resource corresponds to at least one valid slot in a plurality of slots identified using a starting point associated with the first signaling message and the offset in the first signaling message, wherein the first network device is in a first cell, and wherein the starting point associated with the first signaling message and the TDRA field in the first signaling message further indicate a second transmission resource for a second transmission between the apparatus and a second network device in a second cell, wherein the first cell comprises a primary cell, and wherein the second cell comprises a secondary cell, the processor further configured to:

determine a second position of the second transmission resource by determining at least one valid slot in a plurality of slots in the second cell using the starting point associated with the first signaling message and the offset in the first signaling message.

12. The communication apparatus of claim 11, wherein the number of symbols suitable for the first transmission includes at least one flexible symbol that is usable for either a downlink transmission or an uplink transmission.

13. The communication apparatus of claim 11, wherein the processor is configured to:

receive a second signaling message from the first network device indicating whether a flexible slot that includes at least two types of symbols is a valid slot, the at least two types of symbols comprising at least two of: a downlink type, an uplink type, or a flexible type of which a symbol is usable as a downlink symbol or an uplink symbol.

14. A first network device, comprising a processor that is configured to:

transmit a first signaling message to a terminal, wherein the first signaling message includes a time domain resource allocation (TDRA) field that maps to at least one group of time domain resource information that includes an offset indicative of a first transmission resource for a first transmission between the terminal and the first network device, wherein the TDRA field includes a start and length indicator that indicates a start symbol in a slot allocated for the first transmission and a number of symbols allocated for the first transmission in the slot, and wherein a slot is a valid slot in case a number of continuous symbols suitable for performing the first transmission in the slot is equal to or greater than the number of symbols allocated for the first transmission; and perform the first transmission with the terminal using the first transmission resource, wherein a position of the first transmission resource corresponds to at least one valid slot in a plurality of slots identified using a starting point associated with the first signaling message and the offset in the first signaling message, wherein the first network device is in a first cell, and wherein the starting point associated with the first signaling message and the TDRA field in the first signaling message further indicate a second transmission resource for a second transmission between the terminal and a second network device in a second cell, wherein the first cell comprises a primary cell, and wherein the second cell comprises a secondary cell, and wherein a second position of the second transmission resource is determined by at least one valid slot in a plurality of slots in the second cell using the starting point associated with the first signaling message and the offset in the first signaling message.

15. The first network device of claim 14, wherein the number of symbols suitable for the first transmission includes at least one flexible symbol that is usable for either a downlink or uplink transmission.

16. The first network device of claim 14, wherein the processor is configured to:

transmit a second signaling message to the terminal indicating whether a flexible slot that includes at least two types of symbols is a valid slot, the at least two types of symbols comprising at least two of: a downlink type, an uplink type, or a flexible type of which a symbol is usable as a downlink or an uplink symbol.

* * * * *